Dec. 1, 1953  J. S. COCKRELL  2,660,744
MOTOR VEHICLE WASHING PELLET RECLAIMING APPARATUS
Filed Nov. 22, 1949  4 Sheets-Sheet 1

*INVENTOR.*
Jesse S. Cockrell
BY Victor J. Evans & Co.
ATTORNEYS

Dec. 1, 1953

J. S. COCKRELL 2,660,744

MOTOR VEHICLE WASHING PELLET RECLAIMING APPARATUS

Filed Nov. 22, 1949

INVENTOR.
Jesse S. Cockrell
BY Victor J. Evans & Co.
ATTORNEYS

Dec. 1, 1953      J. S. COCKRELL      2,660,744
MOTOR VEHICLE WASHING PELLET RECLAIMING APPARATUS
Filed Nov. 22, 1949      4 Sheets-Sheet 3
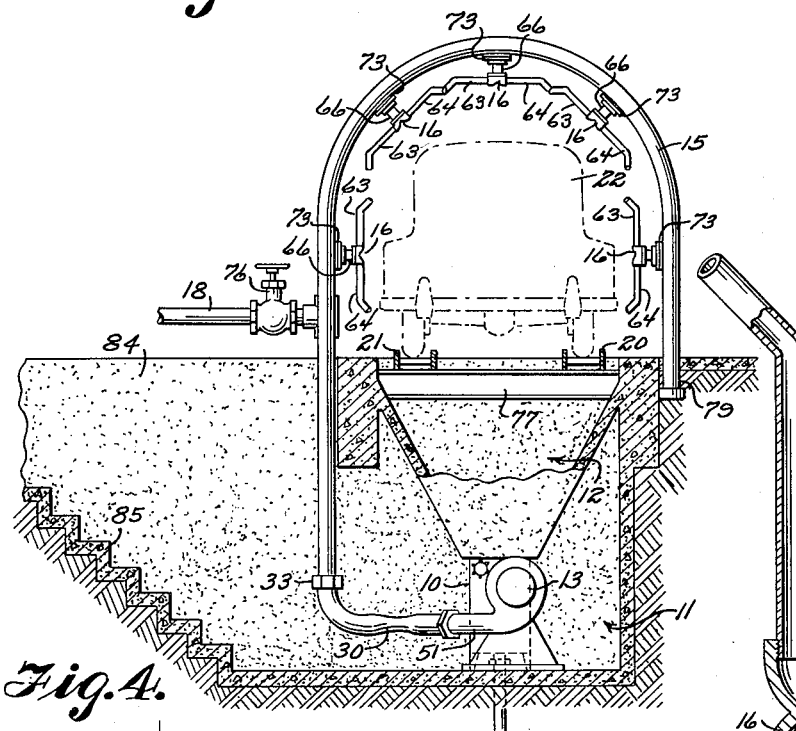
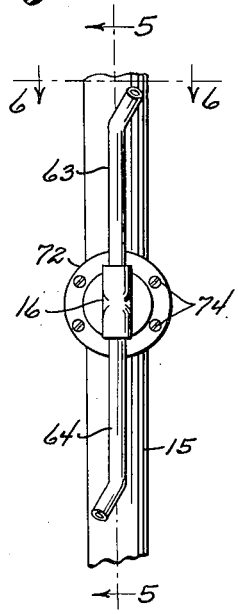
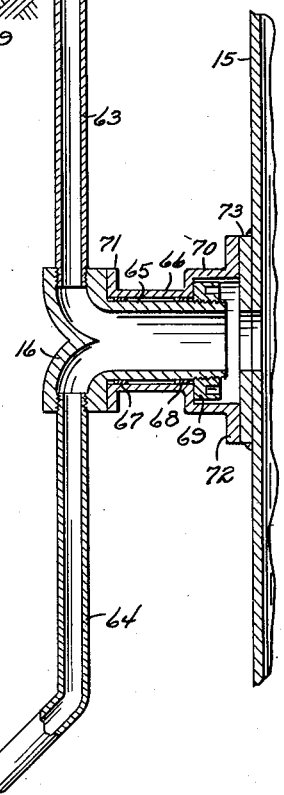
INVENTOR.
Jesse S. Cockrell
BY Victor J. Evans & Co.
ATTORNEYS Dec. 1, 1953　　　J. S. COCKRELL　　　2,660,744
MOTOR VEHICLE WASHING PELLET RECLAIMING APPARATUS
Filed Nov. 22, 1949　　　　　　　　　　4 Sheets-Sheet 4

INVENTOR.
Jesse S. Cockrell
BY Victor J. Evans & Co.

ATTORNEYS

Patented Dec. 1, 1953

2,660,744

UNITED STATES PATENT OFFICE 2,660,744

MOTOR VEHICLE WASHING PELLET RECLAIMING APPARATUS

Jesse S. Cockrell, Norfolk, Va.

Application November 22, 1949, Serial No. 128,807

2 Claims. (Cl. 15—3)

This invention relates to motor vehicle washing and cleaning devices where water is sprayed in combination with pellets of resilient material against the outer surface of a vehicle and in particular an improved method of cleaning and recovering the water and pellets whereby both the water and pellets are recirculated, and also wherein the vehicle is rinsed after washing by fresh or clean water sprayed by revolving spray heads.

The purpose of this invention is to provide an auto laundry wherein dust, dirt and the like are scoured from the surface of a vehicle, by spraying water through revolving spray heads in combination with resilient pellets whereby the entire surface of the vehicle is thoroughly cleaned and wherein the vehicle is rinsed with clean water after washing.

In the usual type of auto laundry it is necessary to use brushes, sponges, chamois and the like to dislodge the usual film of dust found on the surface of a vehicle, and this requires labor. Where water is recirculated it is also necessary to wipe the surface to remove smears and the like. With this thought in mind this invention contemplates an auto laundry in which the surface of the vehicle is thoroughly scoured by small resilient pellets which eliminates the necessity of manually brushing or rubbing the surfaces of the vehicle, and means for cleaning the recovered water, and pellets so that they may be used for recirculating, and also means for rinsing the cleaned surfaces of the vehicle with fresh water.

The object of this invention is, therefore, to incorporate means in an auto laundry whereby water in combination with solid elements may be efficiently sprayed over the surface of a vehicle and in which both the water and pellets are sufficiently clean to be recirculated and reused.

Another object of the invention is to provide cleaning or rinsing sprays in an auto laundry which eliminates the necessity of wiping the objectionable smearing film from washed vehicles.

Another object of the invention is to provide a sediment arresting tank in combination with a pump in an auto laundry where water used in washing motor vehicles is substantially cleaned and adapted for reuse.

A further object of the invention is to provide an auto laundry in which pellets are sprayed in combination with water over the surface of a vehicle and the vehicle is then sprayed with fresh water and wherein the water and pellets are cleaned and recovered, which is of a comparatively simple and economical construction.

With these and other objects and advantages in view the invention embodies a pair of tracks positioned to receive the wheels of a motor vehicle positioned over a sump with a dirt and sediment collecting tank and also a pump in the lower end of the sump and with spaced sets of spray nozzles with one set positioned to receive the recovered water and pellets from the tank in the sump and the other connected to a source of fresh water supply.

Other features and advantages of the invention will appear from the following description taken in connection with the drawing wherein:

Figure 3 is a cross section through the laundry on line 3—3 of Figure 1 with parts broken away and with parts shown in elevation.

Figure 4 is a detail showing an elevational view of one of the rotating spray heads for spraying water and pellets upon the surface of a vehicle.

Figure 5 is a longitudinal section through the spray head being taken on line 5—5 of Figure 4.

Figure 6 is an end elevational view of the spray head being taken on line 6—6 of Figure 4 and with part of the supply pipe shown in section.

Figure 1:
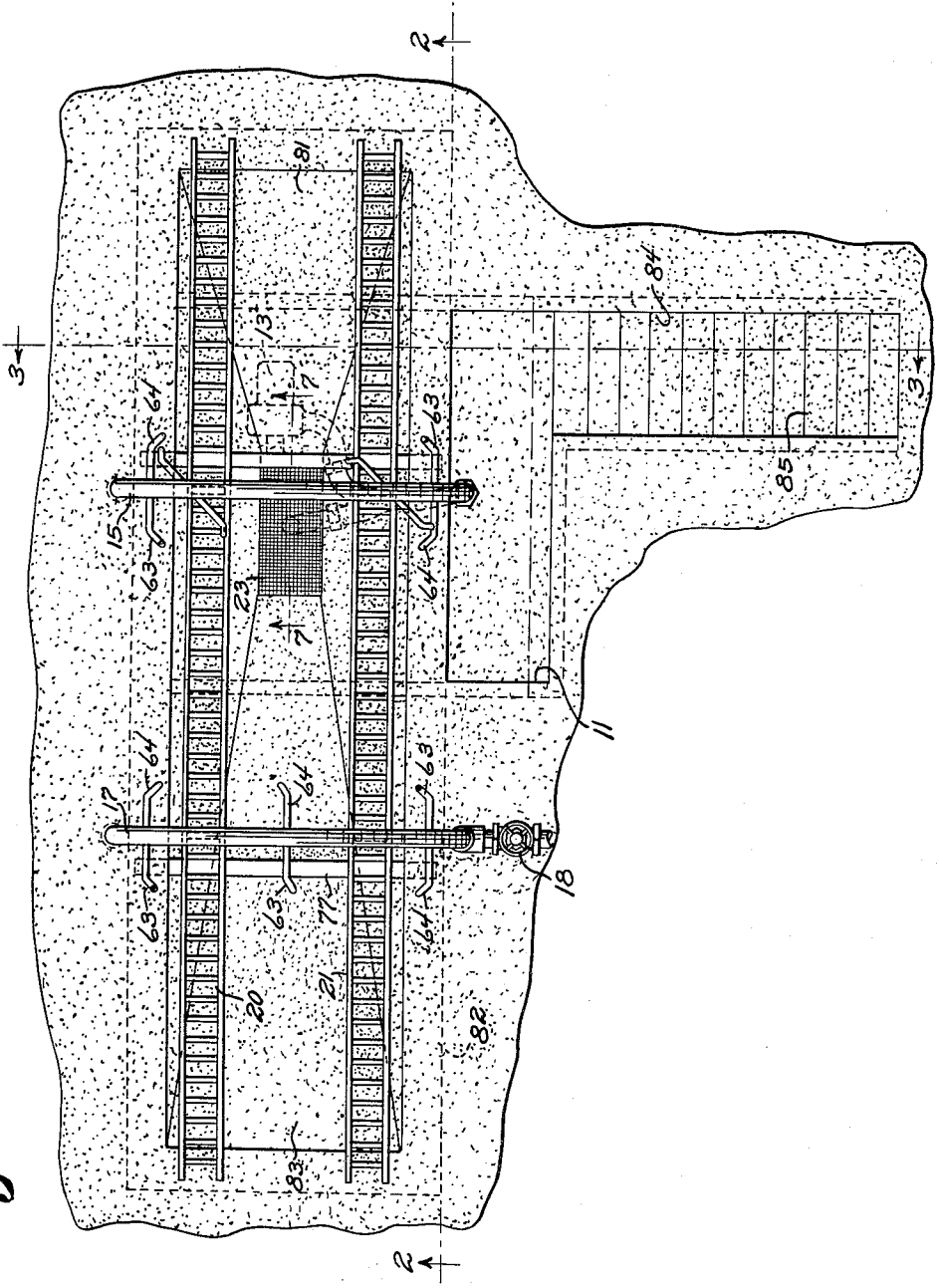
Figure 1 is a plan view illustrating the improved auto laundry.

Referring now to the drawings wherein like reference characters denote corresponding parts the improved auto laundry of this invention includes a tank 10 mounted in a pit 11 and positioned to receive water and pellets from a sump 12, a pump 13 positioned to pump water and pellets from the tank 10 through a venturi 14 to a yoke 15 having rotating spray heads 16 thereon, and a U-shaped tube 17 also having rotating spray heads thereon and provided with a fresh water connection 18 to a source of fresh water supply.

The sump 12 with the tank 10 at the lower end is positioned below spaced parallel tracks 20 and 21 which are positioned to receive the wheels of a motor vehicle and the yoke 15 and tube 17 are positioned to extend around a vehicle positioned on the tracks as illustrated in Figure 3 in which a vehicle is indicated by the dotted line 22.

With the vehicle positioned on the tracks water with pellets, preferably of rubber, is sprayed through the rotating spray head 16 against the surfaces of the vehicle and after the vehicle is thoroughly scoured thereby it is moved through the last screen of clean water sprayed by the rotating spray heads of the tube 17.

Figure 7:
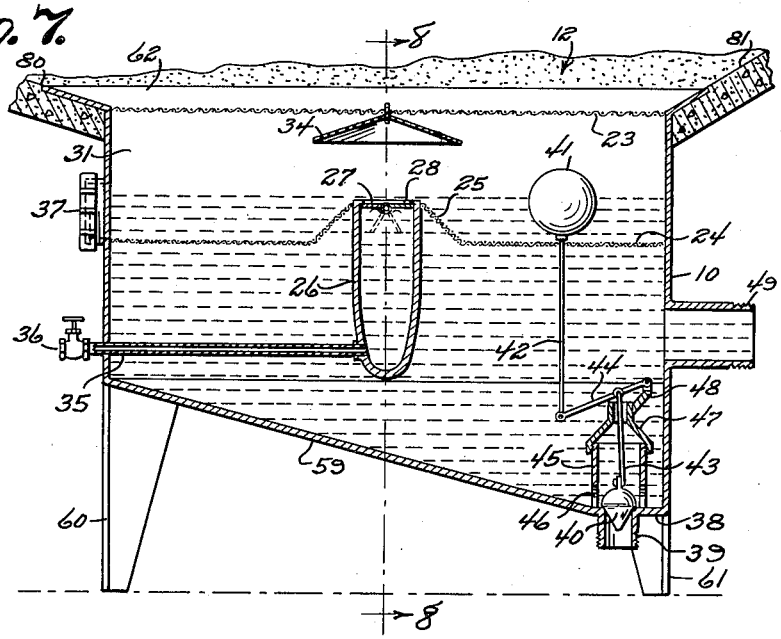
Figure 7 is a longitudinal section through the dirt and sediment collecting tank being taken on line 7—7 of Figure 1 and with the connecting part of the sump broken away.

The water and pellets sprayed upon the vehicle are collected in the sump 12, the sloping inner surfaces of which carry the water and pellets to the upper end of the tank 10 in which a coarse screen 23 is positioned, as shown in Figure 7. Both the water and pellets pass through this screen and both the water and pellets and also dirt, and the like carried by the water are deposited upon a lower screen 24 which is of a comparatively fine mesh so that pellets and the like will be collected thereon.

The screen 24 in the tank 10 is formed with an upwardly extended conical-shaped section 25 through which an outlet pipe 26 is connected to the screen and the opening in the upper end of the pipe is provided with spring actuated valve elements 27 and 28 which normally close the opening through the screen in the upwardly extended conical-shaped section 25. The elements 27 and 28, which are retained in closed position by a spring, are automatically opened by suction of the pump 13 which acts through a Venturi opening 29 in a tubular casing 30 to draw the pellets which are suspended in the water in the upper chamber 31 of the tank through the pipe connections and yoke 15 whereby they are sprayed through the rotating spray head 16 upon the vehicle.

Figure 2:
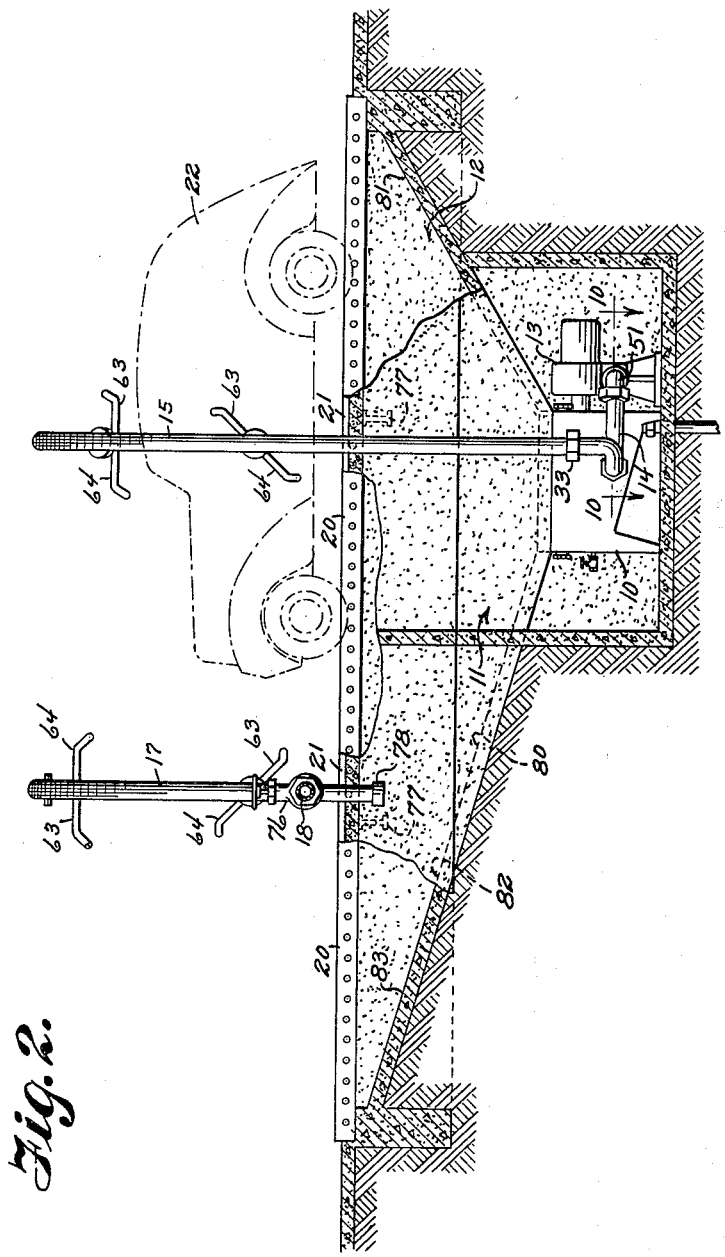
Figure 2 is a longitudinal section through the pit or sump of the laundry with parts broken away and parts shown in elevation, said section being taken on line 2—2 of Figure 1.
Figure 10:
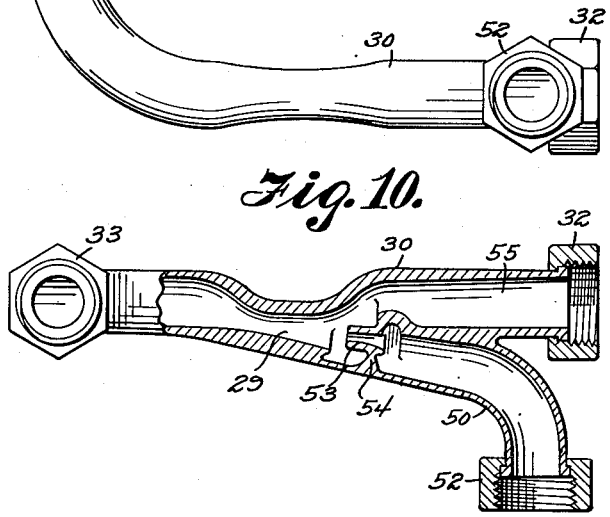
Figure 10 is a sectional plan through the horizontal portion of the inductor or venturi, being taken on line 10—10 of Figure 2.

The casing 30 is connected to the lower end of the pipe 26 by a coupling 32 and the outlet end is connected by a coupling 33 to the lower end of the yoke 15. The casing 30 is also provided with a side connection 50 which, as illustrated in Figs. 1, 2, and 3, extends to the pump 13 whereby with the parts as shown in Fig. 10 fluid under pressure passing through the branch connection 50 and the venturi 29 causes suction in the connection 55 whereby water is pumped from the tank 10 passing through the connection 49 and entering the casing 30 through the branch connection 50 and this water passing through the casing 30 draws pellets from the section of the casing 10 above the screen 24 with the pellets drawn through the elements 27 and 28 and elbow 26, which is connected to the section 55 of the casing 30. The conical-shaped section 25 of the screen 24 provides a bed for gravel and the like whereas the rubber pellets, floating around the upper part of the section of the casing are adapted to be drawn downwardly through the member 26.

A baffle 34 is provided in the upper part of the chamber 31 and suspended from the screen 23 to provide a shield over the opening in the upper end of the pipe 26 to prevent dirt and the like from dropping directly into the pipe. The pipe 26 is also provided with a bleeder connection 35 having a valve 36 on the outer end to provide means for adjusting the suction of the Venturi action in the inductor casing 30.

The tank 10 is provided with a water level gauge 37 and the lower end 38 is provided with a drain connection 39 having a valve 40 therein and with the valve actuated by a float 41 through rods 42 and 43 and a lever 44 level of the water in the tank 10 is controlled. The valve 40 is provided with a tubular casing 45 having openings 46 in the lower end and the upper end is provided with a cap 47 to which the lever 44 is pivotally connected through an arm 48.

Figure 8:
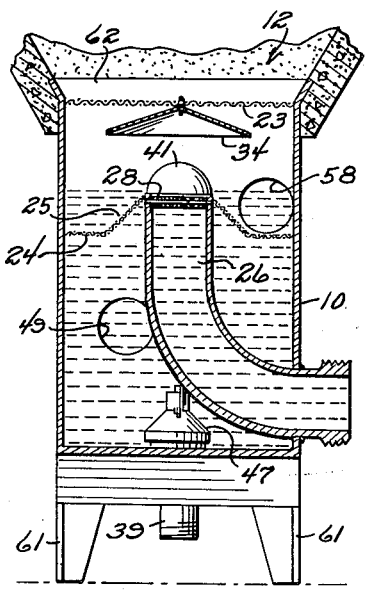
Figure 8 is a cross section through the tank taken on line 8—8 of Figure 7.
Figure 9:
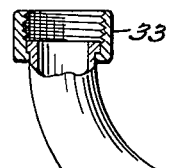
Figure 9 is an end elevational view of the inductor or venturi through which the tank is connected to the discharge of the pump.

The pump 13 is connected to the tank 10 through a nipple 49 and the discharge of the pump is connected to a branch connection 50 of the inductor casing 30 by an elbow 51, the end of which is secured to the end of the branch connection 50 by a coupling 52. The Venturi nozzle 53 is provided in a web 54 in the inner end of the branch connection 50 and with the nozzle positioned at the intersection of the Y-connection suction is created in the connection 55 which is connected to the pipe 26 whereby the valves 27 and 28 are drawn downward to open positions and water and pellets are drawn through the inductor or casing 30 through which they are supplied to the yoke 15. The casing 10 may be provided with a cleanout opening 58 which is positioned above the screens 24 as shown in Figure 8. Dirt and the like passing through the screen 24 pass down the inclined surface 59 forming the lower end of the tank and as the valve 40 is opened the dirt and the like accumulating around the valve casing 45 is washed through the drain connection 39. The tank 10 is supported by legs 60 at one end and 61 at the other. The upper end of the tank is provided with an outwardly flared flange 62 that is embedded in the concrete of the sump as shown in Figure 7.

The rotating spray heads 16 are formed as illustrated in Figures 4, 5 and 6 with tubular arms 63 and 64 threaded in opposite ends of the head 16, and with the ends of the arms angularly positioned as shown, the arms are rotated with the head as water, under pressure, is discharged from the ends thereof. The head 16 is provided with a tubular base 65 that extends into a tubular casing 66 and, as illustrated in Figure 5, the tubular base is journaled in the casing 66, by bearing rings 67 and 68. The inner end of the tubular base 65 is threaded and a hub 69, threaded on the inner end of the tubular base of the head 16 engages a base element 70 of the casing 66 to rotatably hold a spray head in the mounting casing. The outer end of the tubular casing 66 is provided with a flange 71 and the inner end is provided with a flange 72 by which the casing is attached to a flange 73 on the pipe or yoke 15. The flange 72 is secured to the flange 73 by bolts 74 having nuts 75 thereon.

The spray heads of the tube 17 are similar to the spray heads 16 of the yoke 15 and the elements are mounted on the tube in a similar manner.

The supply connection 18 of the tube 17 is provided with a valve 76 and the opposite end of the tube is anchored in the concrete foundation 77 as illustrated at the point 78. The yoke 15 also extends from the inductor or Venturi casing 30 over the upper part of the laundry and the end 79 thereof is buried in the concrete to provide anchoring means therefor.

The lower end of the sump is provided with sloping surfaces 80 and 81, the angles of which are such that the pellets roll downward thereon by gravity and from the point 82 a surface 83 slopes at a lesser angle as water only flows on this surface.

A pit 11 in which the tank 10 and pump 13 are positioned is extended below the sump and a stair well 84 is provided at one side which is provided with steps 85 to provide access to the pit.

With the parts arranged in this manner a motor vehicle is driven on the tracks 20 and 21 and the pellets or small globular projectiles are sprayed with water through the rotating spray heads against the surfaces of the motor vehicle with the projectiles coacting with the water to provide showering means for dislodging a film of dust, dirt and the like on the surface of the vehicle and after the vehicle has passed through this spray it is washed and rinsed by the cleaning spray of the spray heads on the tube 17.

Materials washed from the vehicle pass downwardly with the water into the sump 12 with large articles, such as bolts and nuts, caught by the screen 23 and with the smaller particles passing with the dirt and water through the screen 23 and onto the screen 24 above which the pellets are held in suspension in the water whereby they are drawn through the pipe 26 by the pump and recirculated with the water.

It will be understood that modifications may be made in the design and arrangement of the parts without departing from the spirit of the invention.

What is claimed is:

1. In an auto laundry, the combination which comprises a pair of spaced tracks positioned to receive wheels of a motor vehicle, a sump positioned below the tracks and having downwardly and inwardly sloping lower surfaces, a tank positioned to receive water and the like from the sloping lower surfaces of the sump by gravity, a coarse screen positioned across the upper end of the tank, a fine mesh screen having an upwardly extended conical-shaped section with an opening in the upper part thereof extended across the tank at a point midway between the upper and lower ends thereof and spaced from the coarse screen, an elbow connecting the opening in the upwardly extended conical-shaped section of the fine mesh screen to a venturi positioned outside of the tank, a relief connection extended from said elbow to a point outside of the tank, a valve on the end of said relief connection, positioned outside of the tank, spring actuated valve sections positioned in the opening in the upwardly extended section of the fine mesh screen, a pump positioned to draw water from the tank and discharge the water into the venturi, an inverted U-shaped yoke having spaced spray nozzle bases therein positioned over the tracks and positioned to connect to the venturi, an inverted U-shaped tube also having nozzle base elements therein spaced from the yoke and also positioned to spray water on the vehicles on the tracks, and a plurality of spray nozzle heads with arms extending outwardly from said spray nozzle bases journaled in the spray nozzle bases of the yoke.

2. In an auto laundry, the combination which comprises a pair of spaced tracks positioned to receive wheels of a motor vehicle, a sump positioned below the tracks and having downwardly and inwardly sloping lower surfaces, a tank positioned to receive water and the like from the sloping lower surfaces of the sump, a coarse screen positioned across the upper end of the tank, a fine mesh screen having an upwardly extended conical-shaped section with an opening in the upper part thereof extended across the tank at a point midway between the upper and lower ends thereof and spaced from the coarse screen, an elbow connecting the opening in the upwardly extended conical-shaped section of the fine mesh screen to a venturi positioned outside of the tank, a relief connection extended from said elbow to a point outside of the tank, a valve on the end of said relief connection positioned outside of the tank, spring actuated valve sections positioned in the opening in the upwardly extended section of the fine mesh screen, a pump positioned to draw water from the tank and discharge the water into the venturi, an inverted U-shaped yoke having spaced spray nozzle bases therein positioned over the tracks and positioned to connect to the venturi, an inverted U-shaped tube also having nozzle base elements therein spaced from the yoke and also positioned to spray water on vehicles on the tracks, a fresh water supply connection having a valve therein extended from said U-shaped tube, a plurality of spray nozzle heads with arms extending outwardly from said spray nozzle bases journaled in the spray nozzle bases of the yoke and tube, and a float controlled valve in said tank for drawing off sediment accumulating in the tank and for maintaining water at a constant level in the tank.

JESSE S. COCKRELL.

References Cited in the file of this patent

UNITED STATES PATENTS

| Number | Name | Date |
| --- | --- | --- |
| 1,465,085 | Macabee | Aug. 14, 1923 |
| 1,660,345 | Merseles | Feb. 28, 1928 |
| 1,701,066 | Elkington | Feb. 5, 1929 |
| 1,737,257 | Merseles | Nov. 26, 1929 |
| 1,761,492 | Reily | June 3, 1930 |
| 1,907,411 | Timoney | May 2, 1933 |
| 1,934,494 | Gillespie | Nov. 7, 1933 |
| 2,236,895 | Court | Apr. 1, 1941 |